(12) United States Patent
Della Polla

(10) Patent No.: US 6,209,218 B1
(45) Date of Patent: Apr. 3, 2001

(54) SQUARING SYSTEM

(76) Inventor: Michael Della Polla, 4039 Willowmere Trace, Kennesaw, GA (US) 30144

( * ) Notice: Subject to any disclaimer, the term of this patent is extended or adjusted under 35 U.S.C. 154(b) by 0 days.

(21) Appl. No.: 09/321,995

(22) Filed: May 28, 1999

Related U.S. Application Data

(60) Provisional application No. 60/093,761, filed on Jul. 22, 1998.

(51) Int. Cl.$^7$ ........................................................ G01B 5/00
(52) U.S. Cl. .................................................. 33/645; 33/628
(58) Field of Search ............................. 33/613, 628, 633, 33/634, 640, 641, 645

(56) References Cited

U.S. PATENT DOCUMENTS

| | | | | |
|---|---|---|---|---|
| 4,137,643 | * | 2/1979 | Carmel | 33/613 |
| 4,566,193 | * | 1/1986 | Hackleman et al. | 33/645 |
| 5,735,054 | * | 4/1998 | Cole | 33/640 |
| 5,797,193 | * | 8/1998 | Amend et al. | 33/645 |

* cited by examiner

*Primary Examiner*—G. Bradley Bennett
(74) *Attorney, Agent, or Firm*—Thomas, Kayden, Horstemeyer & Risley, L.L.P.

(57) ABSTRACT

A squaring system for aligning structural elements. The system comprises a first alignment member, a second alignment member, and a plurality of alignment openings arranged in rows in each of the first and second alignment members, the openings of the first row being spaced from each other a predetermined distance X and the openings of the second row being spaced from each other a predetermined distance Y, with the distance X being different from distance Y. Arranged in this manner, a lock member that is sized and configured to extend into the alignment openings can be inserted into selected openings of each row to fix the relative positions of the first and second alignment members.

14 Claims, 3 Drawing Sheets

SQUARING SYSTEM

CROSS-REFERENCE TO RELATED APPLICATION

This document claims priority to and the benefit of the filing date of co-pending and commonly assigned provisional application entitled "SQUARING ADJUSTMENT SYSTEM FOR ALIGNMENT AND CALIBRATION OF SHEETING EQUIPMENT" assigned Ser. No. 60/093,761, filed Jul. 22, 1998, which is hereby incorporated by reference herein.

FIELD OF THE INVENTION

The present invention generally relates to a squaring system. More particularly, the present invention relates to a squaring system particularly well suited for aligning and calibrating a panel saw assembly.

BACKGROUND OF THE INVENTION

Panel saw assemblies are used for cutting various types of materials and typically comprise a frame upon which a saw carriage is mounted in a vertically movable relationship with respect to the assembly. The saw carriage normally is attached to the frame via vertical guide rails along which the saw carriage can be moved. The saw carriage typically can be locked in any desired vertical position along the length of the guide rails for horizontal (rip) cuts, or can be unlocked so that it can be used to make vertical (cross) cuts. The saw carriage supports a panel saw mounted thereto that performs the cutting of the material placed on the frame of the assembly. The frame normally also has a support pan mounted thereon that supports the material being sawed.

One problem with conventional panel saw assemblies, is that it is often difficult to ensure that square cuts can be made, especially after continued use. In such conventional panel saw assemblies, squaring of the assembly normally is accomplished by adjusting the vertical guide rails. In particular, either the top or bottom end of each guide rail is laterally adjusted with respect to the frame to both ensure that each guide rail is perpendicular to the work piece supported by the frame, as well as parallel to the other guide rail. Although it is possible to correctly square a panel saw assembly through such adjustment of the vertical guide rails, typically it is difficult to do so. Even if one of the guide rails is aligned correctly, it still may be difficult to ensure that the guide rails are parallel to each other. Moreover, even if the guide rails are aligned so as to be parallel, it is possible for either or both of the guide rails to become skewed over time as the saw panel assembly is used. Furthermore, it is difficult to make small alignment adjustments. Often, the guide rails are laterally moved either too far or not far enough. Therefore, the alignment process can be a time consuming process requiring protracted trial and error.

From the above, it can be appreciated that it would be desirable to have a squaring system which provides for simplified squaring of two structural members such as the vertical guide rails of a panel saw assembly, and which allows for simplification of the alignment process and which prevents these members from falling out of alignment once so aligned.

SUMMARY OF THE INVENTION

The present invention relates to a squaring system for aligning structural elements. The system comprises a first alignment member, a second alignment member, a plurality of alignment openings provided in each of the first and second alignment members, the alignment openings being arranged in a first row in the first alignment member and being arranged in a second row in the second alignment member, the openings of the first row being uniformly spaced from each other a predetermined distance X and the openings of the second row being uniformly spaced from each other a predetermined distance Y, wherein distance X is different from distance Y, and a lock member that is sized and configured to extend into the alignment openings to fix the relative positions of the first and second alignment members.

The present invention further relates to a method for aligning structural elements. The method comprises the steps of providing a first alignment member with a first row of alignment openings and providing a second alignment member with a second row of alignment openings, the openings of the first row being uniformly spaced from each other a predetermined distance X and the openings of the second row being uniformly spaced from each other a predetermined distance Y, wherein distance X is different from distance Y, and extending a lock member into selected alignment openings to fix the relative positions of the first and second alignment members.

The objects, features, and advantages of this invention will become apparent upon reading the following specification, when taken in conjunction with the accompanying drawings. It is intended that all such additional features and advantages be included therein with the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
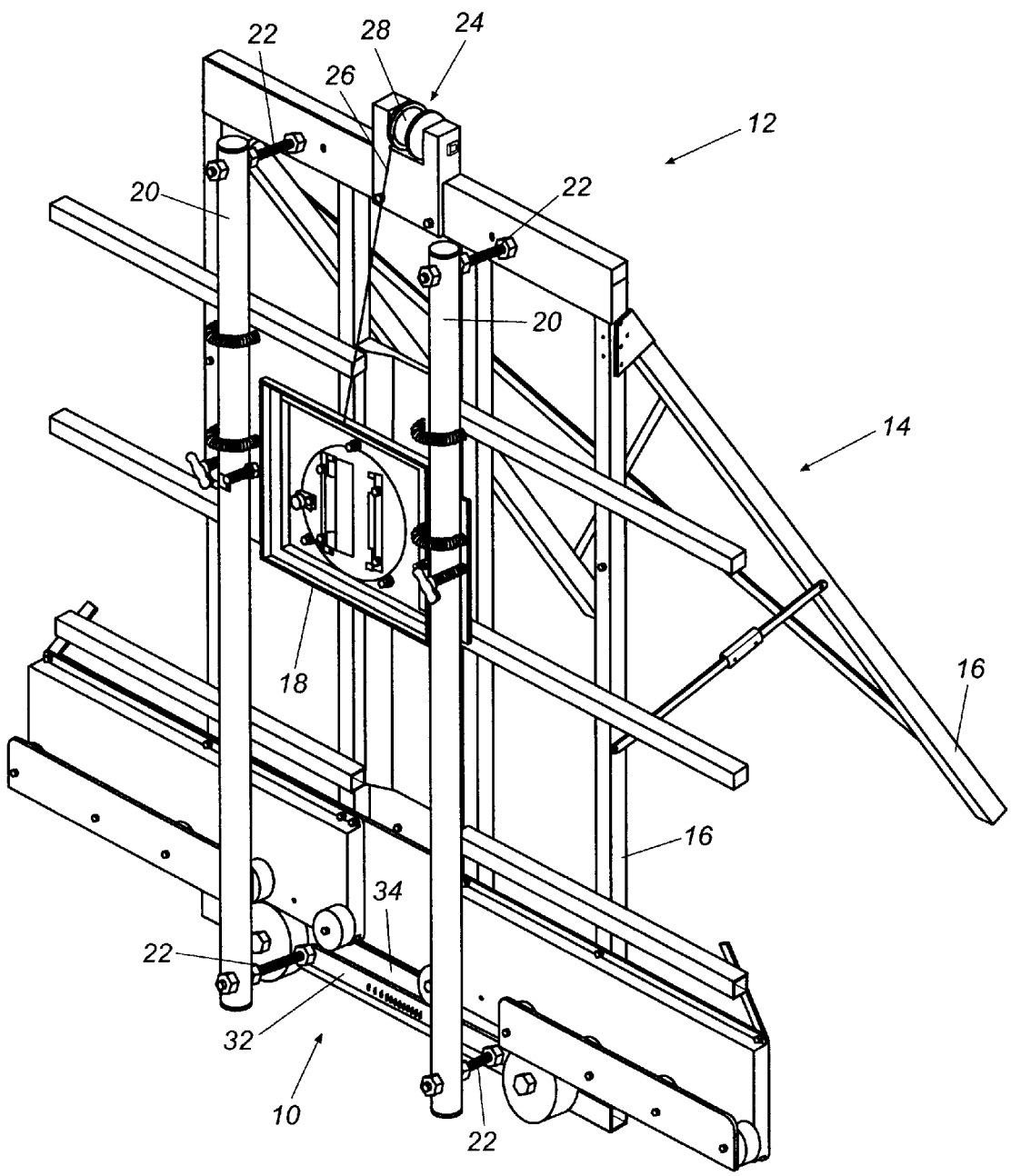
FIG. 1 is a perspective view of a squaring system constructed in accordance with the principles of the present invention and shown in use with a panel saw assembly.

Referring now in more detail to the drawings, in which like numerals indicate corresponding parts throughout the several views, FIG. 1 illustrates a squaring system 10 suitable for use with a panel saw assembly 12 of the type known in the art. Although the squaring system 10 is described and shown as used in a panel saw assembly, it is to be understood that the principles of the present disclosure are applicable to squaring adjustment in general.

As indicated in FIG. 1, the panel saw assembly 12 generally comprises a frame 14 that includes a plurality of support members 16. The support members 16 of the frame 14 provide support for the material to be cut with the panel saw (not shown) that is mounted to the panel saw carriage 18. The frame 14 further includes vertical guide rails 20 that are secured to the frame as with support rods 22. The panel saw carriage 18 is slidably mounted to each of the vertical guide rails 20 such that the carriage can move upwardly and downwardly along the longitudinal extent of the rails to adjust the vertical position of the panel saw. Typically, the panel saw carriage 18 is connected to a biased pulley system 24 which includes a cable 26 that is attached to the carriage and which wraps around a pulley 28 which is mounted to a top portion of the panel saw assembly 12. When provided with such a pulley system 24, the panel saw carriage 18 is upwardly biased such that the cable 26 exerts a constant upward force on the panel saw carriage so that, when the saw is not in use, the panel saw carriage is urged towards the top ends of the vertical guide rails 20.

Figure 2:
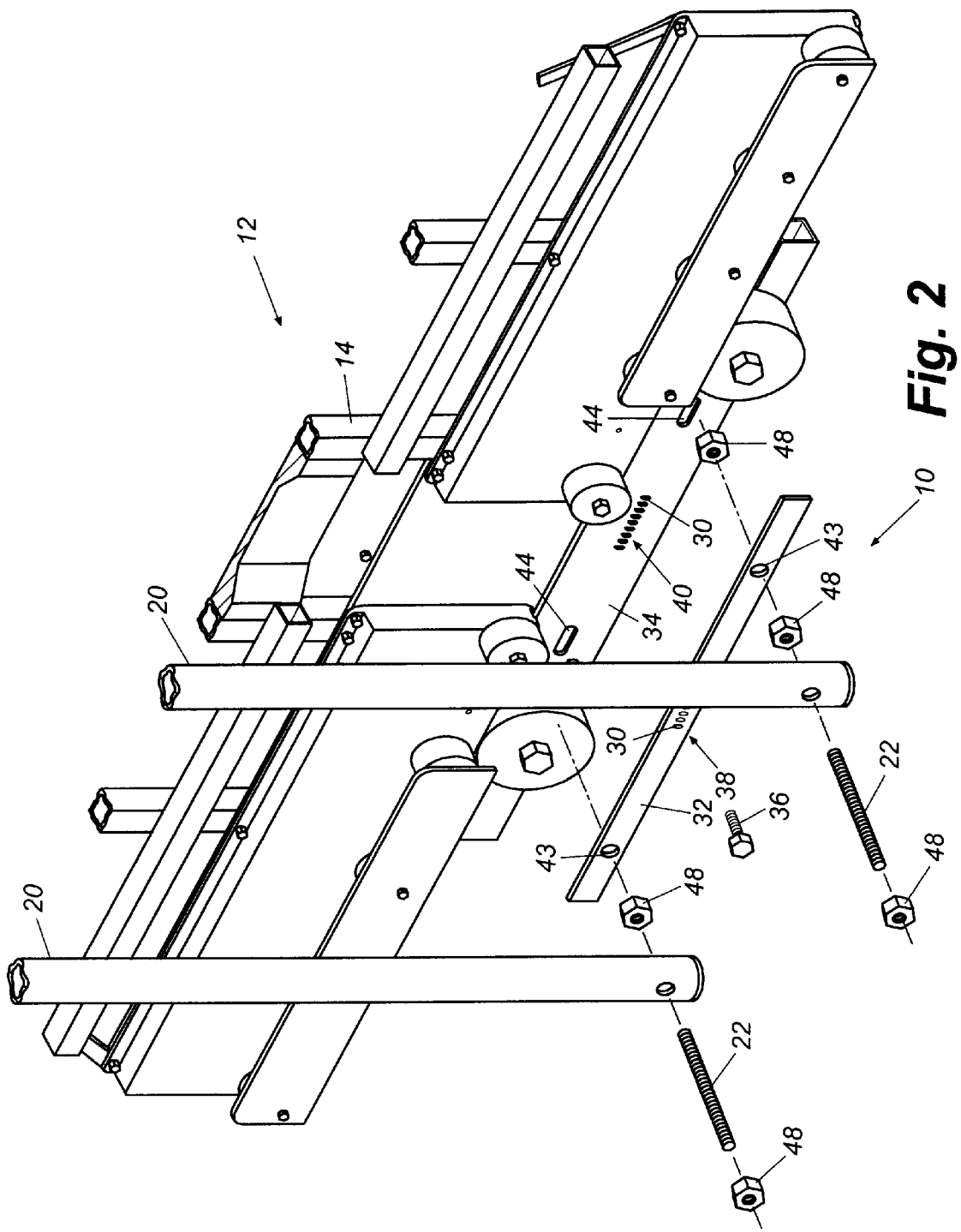
FIG. 2 is a perspective view of the squaring system of FIG. 1, shown exploded from the panel saw assembly.

FIG. 2 illustrates the squaring adjustment system 10 and the vertical guide rails 20 exploded from the panel saw assembly frame 14. As indicated in this figure, the squaring adjustment system 10 generally comprises an arrangement of alignment openings 30 provided in first and second alignment members 32 and 34, and lock member 36. Where the squaring system 10 is to be used in a panel saw assembly 12 such as that depicted in FIG. 1, the first adjustment member 32 can comprise an elongated guide rail connector and the second member 34 can comprise an elongated base of the assembly frame 14. Although capable of alternative construction, each adjustment member 32, 34 is made of a substantially rigid material such as steel. Irrespective of the material chosen, each of the adjustment members 32, 34 is provided with its own row 38, 40 of alignment openings 30. Each of the alignment openings 30 are sized and configured so as to be capable of receiving the lock member 36, which preferably comprises a pin, bolt, or other conventional fastener.

In addition to the alignment openings 30, each of the first and second adjustment members 32, 34 further includes at least two support rod openings 43 and 44, respectively. The rod opening 43 provided in the first adjustment member 32 normally is substantially round in shape so as to conform with the diameter of the rod 22 while the rod opening 44 provided in the second adjustment member 34 normally is substantially elongated to allow lateral adjustment of rod 22. To facilitate mounting of the guide rails 20 to the frame 14, each guide rail typically includes an opening 46 through which a support rod 22 can pass. As is known in the art, the support rods 22 maintain the proper orientation of each guide rail 20 with respect to the frame 14 and with respect to each other, and further maintain a predetermined amount of spacing between the first adjustment member 32 and second adjustment member 34 for the material to be cut. This spacing typically is obtained by using the support rods 22 in conjunction with fastening elements 48 such as threaded nuts.

Figure 3:
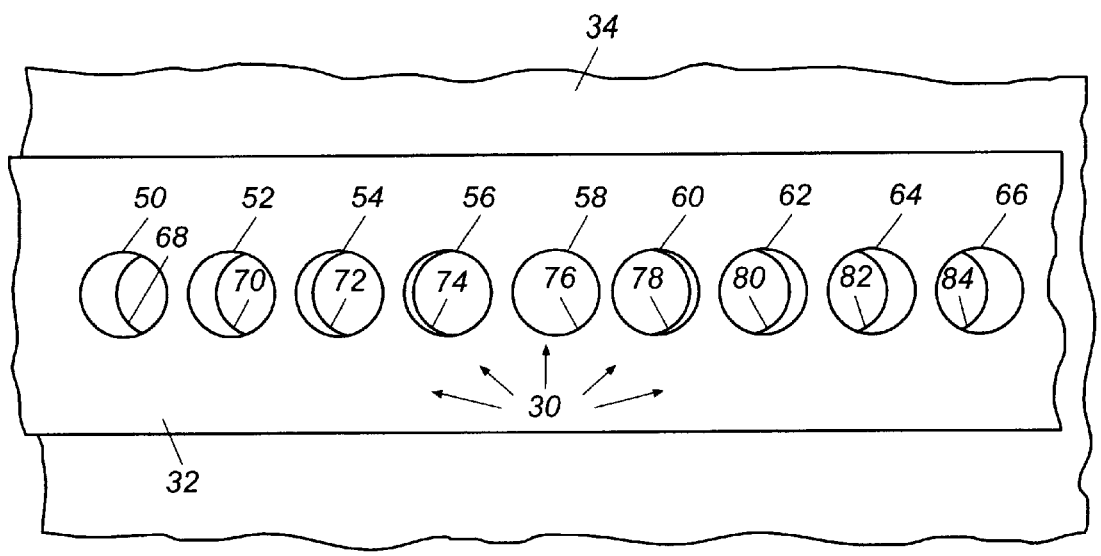
FIG. 3 is a front view of first and second alignment members of the squaring system, shown aligned in a first orientation.

Effective squaring through use of the squaring system described herein is feasible primarily due to the arrangement of alignment openings 30 provided in the first and second alignment members 32 and 34. As indicated in FIG. 3, when the first alignment member 32 is placed over top the second alignment member 34, the alignment openings 30 of each row 38, 40 are arranged together in a substantially straight line along the longitudinal extent of each member. Typically, the openings 30 are spaced an equal distance apart from each other so as to be spaced uniformly along this line. However, the spacing in each row 38, 40 is different. By way of example, the spacing of the alignment openings 30 in row 38 of the first alignment member 32 is approximately 5/32 inches while the spacing between the alignment openings 30 of row 40 of the second alignment member 34 is approximately 4/32 inches. When the first and second alignment members 32 and 34 are used in conjunction, this disparate spacing provides for fine incremental adjustment of the lateral positions of each vertical guide rail 20.

As is further indicated in FIG. 3, the first and second alignment members 32 and 34 each can comprise nine alignment openings 30. Each of these alignment openings 30 is individually numbered in FIG. 3 (50–66 in the first row 38, 68–84 in the second row 40), for convenience of discussion. As shown in this figure, the disparate spacing of the alignment openings 30 results in an arrangement in which not all of the openings 30 align with each other at the same time. Typically, only one opening 30 of the first alignment member 32 will align with an opening 30 of the second alignment member 34 at a time. In the arrangement shown in FIG. 3, for example, the first and second alignment members 32 and 34 are aligned such that the central opening 58 of the first alignment member is aligned with the central opening 76 of the second alignment member. Aligned in this maimer, these openings are adapted to receive the lock member 36 to fix the position of the first alignment member 32 relative to the second alignment member 34. As can be appreciated with reference to FIGS. 1 and 2, the placement of the lock member 36 in these openings 30 thereby secures the vertical guide rails 20 in a particular lateral position with respect to both the panel saw assembly frame 14 and to each other. Due to the fact that the openings 44 provided in the first alignment member 32 are substantially round (i.e., not elongated), the vertical guide rails 20 will not be laterally shifted relative to each other by use of the panel saw assembly. To further ensure that shifting of both vertical guide rails 20 relative to the assembly will not occur, the support rods 22 can be fastened in place with the fastening elements 48.

Figure 4:
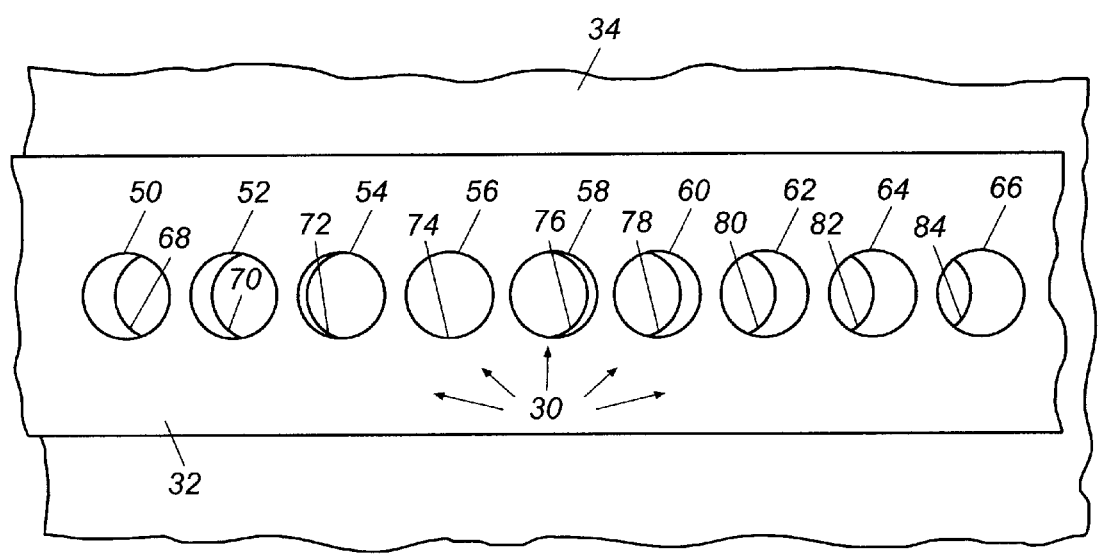
FIG. 4 is a front view of the alignment members of FIG. 3, shown aligned in a second orientation.

To adjust the lateral positioning of the bottom ends 45 of both vertical guide rails 20 without altering their relative positions with respect to each other, the first alignment member 32 is shifted laterally with respect to the second alignment member 34 in the desired direction. FIG. 4 illustrates a second orientation of the first alignment member 32 with respect to the second alignment member 34 and placing the lock member 36 through a different pair of aligned openings. In particular, this figure shows the first alignment member 32, shifted one incremental position to the right. As is evident from this figure, the opening 30 immediately to the left of the central opening 58 of the first alignment member 32 (opening 56) is aligned with the opening 30 immediately to the left of the central opening 76 of the second alignment member 34 (opening 74).

As can be appreciated from the above discussion, the lateral position of the bottom ends 45 of the vertical guide rails 20 can be adjusted in very small increments so as to permit fine tuning when squaring the guide rails relative to the panel saw assembly frame 14. By way of example, when the spacing provided between each opening 30 in the first alignment member 32 is approximately 5/32 inches, and the spacing between the alignment openings 30 of the second alignment member 34 is approximately 4/32 inches, the smallest incremental lateral adjustment possible will be approximately 1/32 inches. If necessary, however, larger lateral adjustments are feasible with the squaring system 10 by merely shifting the first alignment member 32 to a greater degree with respect to the second alignment member 34. For the particular embodiment described above, the bottom ends of the vertical guide rails 20 can be moved approximately two inches to either side, if the left most opening 50 of one of the alignment members is aligned with the right most opening 84 of the other alignment member.

While preferred embodiments of the invention have been disclosed in detail in the foregoing description and drawings, it will be understood by those skilled in the art that variations and modifications thereof, such as the number of openings provided in the first and second alignment members 32 and 34, as well as the spacing of these openings, can be made without departing from the spirit and scope of the invention as set forth in the following claims.

What is claimed is:

1. A squaring system for aligning vertical guide rails of a panel saw assembly relative to the panel saw assembly frame and to each other, comprising:

an elongated guide rail connector, said connector being adapted to connect the vertical guide rails such that the separation distance between the vertical guide rails is fixed;

an elongated base, said base being adapted to connect to the panel saw assembly frame in close proximity to said elongated guide rail connector;

a plurality of alignment openings provided in each of said guide rail connector and said base, said alignment openings being arranged in a first row in said guide rail connector and being arranged in a second row in said base; and a lock member that is sized and configured to extend into selected alignment openings of said guide rail connector and said base to fix their relative positions.

2. The system of claim 1, wherein said openings of said first row are spaced a predetermined distance X from each other and said openings of said second row are spaced a predetermined distance Y from each other, wherein distance X is different from distance Y.

3. The system of claim 2, wherein the distance X is greater than the distance Y.

4. The system of claim 3, wherein said rows of alignment openings extend along a longitudinal direction of said elongated guide rail connector and said elongated base.

5. The system of claim 1, wherein said elongated guide rail connector includes at least two substantially round mounting openings used to mount the vertical guide rails to the panel saw assembly frame.

6. The system of claim 1, wherein said elongated base includes at least two elongated mounting openings used to mount the vertical guide rails to the panel saw assembly frame.

7. A panel saw assembly, comprising:

a panel saw assembly frame;

a pair of vertical guide rails mounted to said panel saw assembly frame and being adapted to slidably receive a panel saw carriage thereon;

an elongated base mounted to a lower portion of said panel saw assembly frame;

an elongated guide rail connector, said connector pivotally connecting said vertical guide rails such that the separation distance between said vertical guide rails is fixed at the pivot point, said guide rail connector being positioned in close proximity to said elongated guide rail connector;

a plurality of alignment openings provided in each of said guide rail connector and said base, said alignment openings being arranged in a first row in said guide rail connector and being arranged in a second row in said base; and a lock member that is sized and configured to extend into said selected alignment openings of said guide rail connector and said base to fix their relative positions.

8. The system of claim 7, wherein said openings of said first row are spaced a predetermined distance X from each other and said openings of said second row are spaced a predetermined distance Y from each other, wherein distance X is different from distance Y.

9. The system of claim 8, wherein the distance X is greater than the distance Y.

10. The system of claim 7, wherein said rows of alignment openings extend along a longitudinal direction of said elongated guide rail connector and said elongated base.

11. The system of claim 7, further comprising support rods that extend through said vertical guide rails and said elongated guide rail connector to mount said guide rails to said panel saw assembly frame.

12. A method for aligning guide rails of a panel saw assembly, comprising:

providing a first alignment member having a first row of alignment openings;

connecting the guide rails to the first alignment member such that their relative spacing is fixed by the first alignment member;

providing a second alignment member having a second row of alignment openings; and extending a lock member into selected alignment openings of the first and second rows of alignment openings to fix their relative positions and thereby fix the positions of the guide rails relative to the second alignment member.

13. The method of claim 12, wherein the openings of the first row are uniformly spaced from each other a predetermined distance X and the openings of the second row are uniformly spaced from each other a predetermined distance Y, wherein distance X is different from distance Y.

14. The method of claim 13, wherein the second alignment member forms part of a frame of the panel saw assembly.

* * * * *